United States Patent Office 3,511,298
Patented May 12, 1970

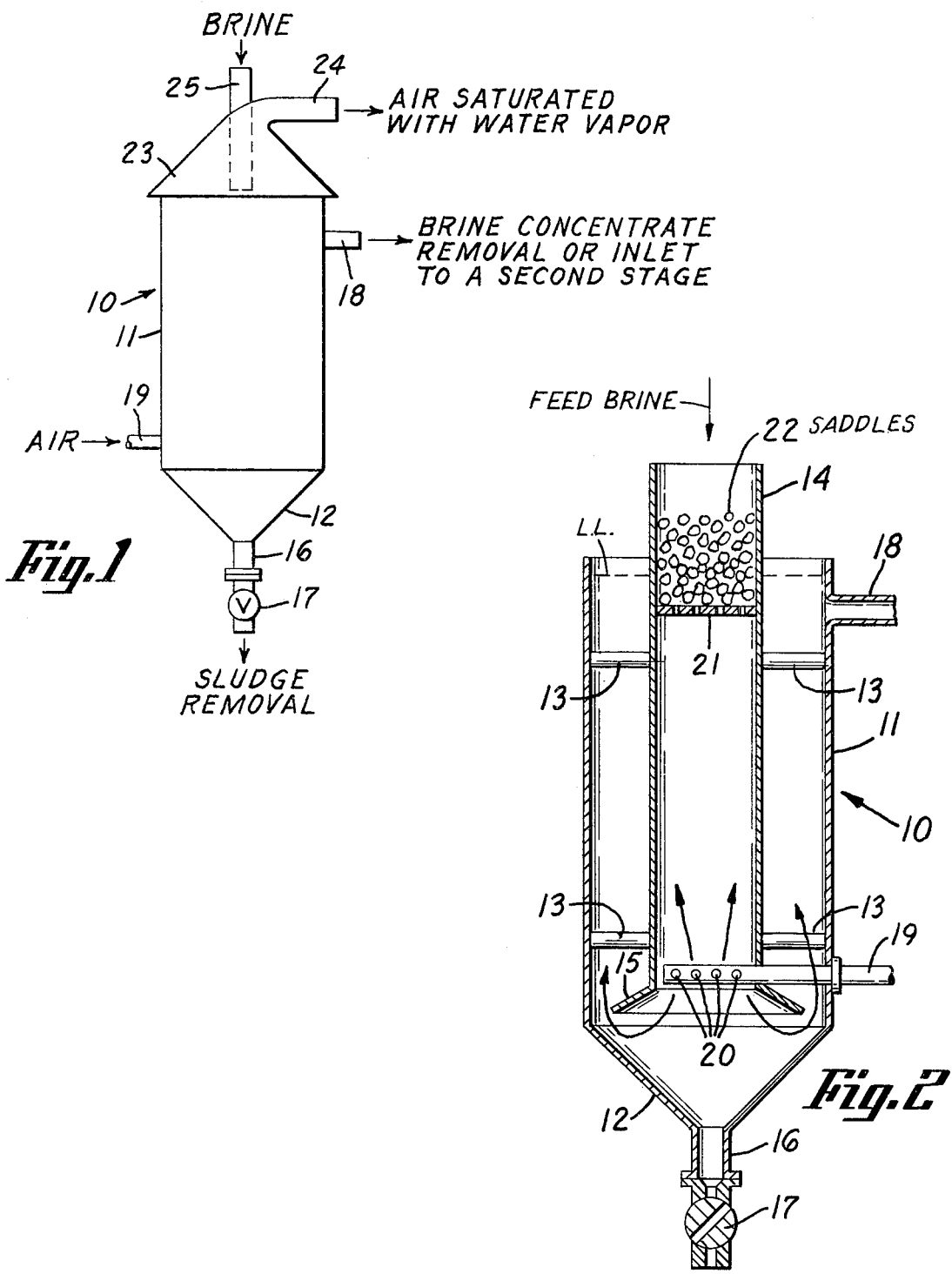

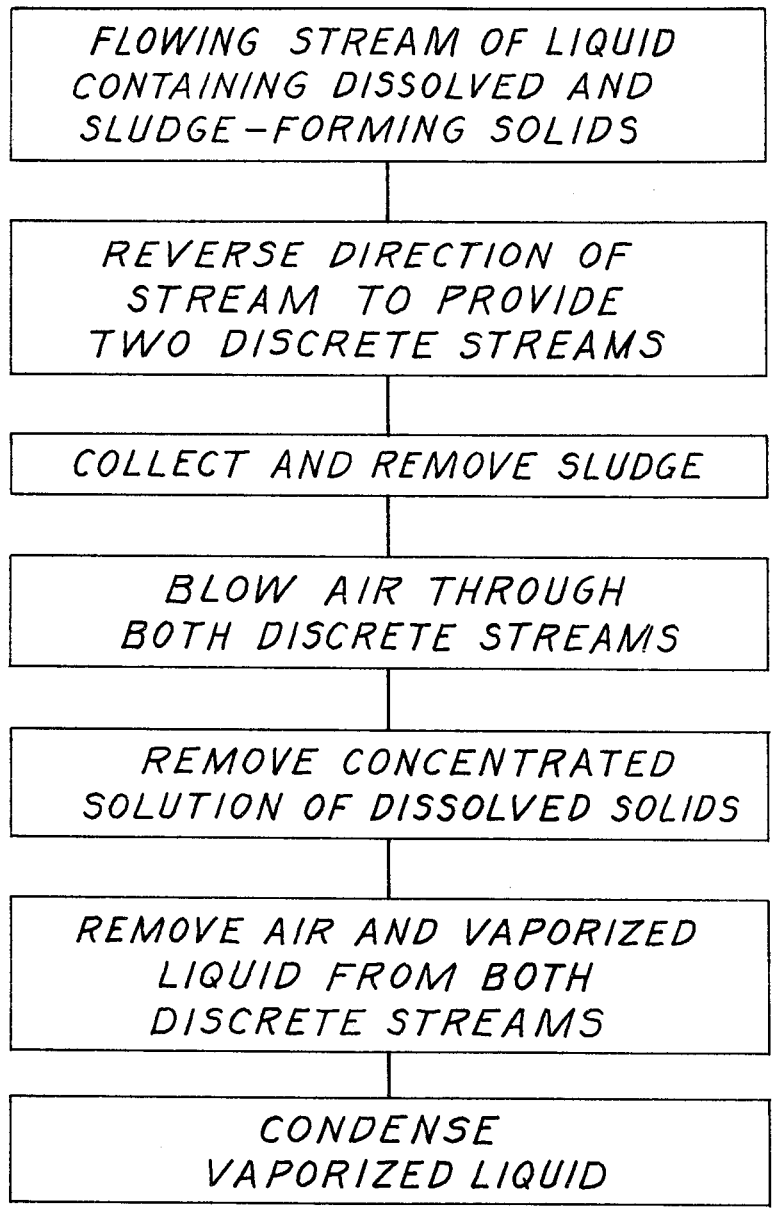

3,511,298
APPARATUS FOR CONCENTRATION OF AND RE-
COVERY OF CONSTITUENTS FROM LIQUID
SOLUTIONS
Robert C. McConnell, 408 Red Haw Road, Dayton, Ohio
45405, and Walter R. Barrett, Apt. 3, 108 S. Hubert
Ave., Springfield, Ohio 45505
Filed May 25, 1967, Ser. No. 641,353
Int. Cl. B01d 1/14, 23/00
U.S. Cl. 159—16
2 Claims

ABSTRACT OF THE DISCLOSURE

Apparatus for concentrating and for recovery of various constituents from a liquid solution by reversing the direction of flow of the solution within a container and by blowing air through the solution to evaporate a portion of the liquid in the container. A baffle is positioned near the point of flow reversal to confine settleable constituents to an area below the baffle from which they may be removed, concentrated soluble constituents being removed from the area above the baffle. Air and vaporized liquid arising from the free surface of the solution in the container may be collected and chilled to recover the vaporized liquid.

Field of invention

The invention relates to apparatus and/or process for the recovery of constituents from and the concentration of a liquid solution by utilizing air to evaporate a portion of the liquid. More particularly, the invention relates to apparatus and/or process for concentrating a brine solution and for the reclaiming of minerals and other material contained in such solution.

Prior art

Prior to the present invention, the prior art discloses various means and/or processes for the purification, drying, and/or separation of various constituents from various materials. For example, Bonsall Pat. 1,822,431 discloses a device for evaporating moisture from material to be dried by blowing a stream of air across the surface of such material. Peterson Pat. 2,773,545 relates to an arrangement for cooling combustion gases before passing them through an organic liquid to avoid burning or charring of the liquid. Similarly, Campbell Pat. 668,159 blows air through milk under carefully controlled conditions to obtain a dehydrated milk product. Svanoe Pat. 3,266,264 employs a refrigerant in a freezing process for converting saline water to brine free water. The above noted patents exemplify the state of the art prior to the present invention and over which the present invention is an improvement.

Summary and objects

In certain fields of industry, particularly the oil and gas industry, there is often produced a continuous flow of salt water or brine which also contains certain minerals and other constituents which preclude disposition of the brine unless it is given a processing treatment to remove certain of such constituents. Additionally, it has been found that such constituents have considerable commercial value if they can be removed from the brine in an economical manner. The oil or gas wells, and hence the source of such brine, are often located in remote areas which may be visited periodically from time to time by personnel concerned with operations but in many instances are unattended for substantial periods of time between such visits. Furthermore, the remoteness of such locations makes the installation of conventional distillation and/or separation equipment undesriable and exceedingly expensive. Additionally, the installation of such equipment would entail installation of additional power facilities as well as operating personnel thereby greatly adding to the installation expense. Accordingly, it is an object of the invention to provide apparatus and/or process for obviating such difficulties.

Another object is to provide improved apparatus and process for separating and removing various constituents from and/or concentrating a flowing stream of liquid.

A further object is to provide improved apparatus and process for reclaiming various constituents from a liquid and for concentrating the same which are inexpensive and of simple construction, essentially automatic in operation with a minimum amount of attention required of operating personnel, and which are operable from existing sources of power supply.

Still another object is to provide improved apparatus and process for concentrating salty water or brine and for the reclaiming therefrom of purified water and other constituents of the brine.

Description

Other objects and advantages will become apparent from the following description taken in conjunction with the accompanying drawings in which:

FIG. 1 is a diagrammatic side elevational view of a device embodying the invention;

FIG. 2 is a sectional view of the device of FIG. 1 with the hood portion thereof omitted in the interests of clarity; and, FIG. 3 is a diagrammatic view illustrating a process embodiment of the invention.

In the drawings, a device for concentrating and separating components from a liquid is indicated generally at 10. The device comprises a cylindrical outer wall 11 having a conical bottom 12. A plurality of support members 13 are connected at their outer ends to outer wall 11, and at their inner ends to an inner wall 14 that is substantially cylindrical and centrally disposed relative to outer wall 11. Inner wall 14 has connected thereto at its lower end an outwardly flared conical portion or baffle 15 which extends toward but terminates short of the outer wall 11.

To permit the selective removal of material from the conical bottom portion 12, there is provided a suitable conduit 16 and valve 17. Similarly, to provide means for the removal of liquid from the upper portion of the device 10, a conduit 18 is provided adjacent but spaced from the upper edge of outer wall 11.

In accordance with the invention, air is introduced and caused to flow through the brine solution while it is contained within the device 10. For this purpose, an air supply conduit 19 is provided which extends through the inner and outer container walls, 14 and 11 respectively, so that an end portion of conduit 19 is disposed within the cylindrical inner wall 14 and, if desired, may be provided with a plurality of perforations 20 to provide for a relatively uniform distribution of air within the device 10.

As is best illustrated in FIG. 2, the upper end of inner wall 14 extends somewhat above the corresponding upper edge of outer wall 11. A perforate member or grid 21 is connected to and disposed transversely relative to inner walls 14 and is disposed approximately at the same level as that of conduit 18. Grid 21 serves as a support for a quantity of saddles 22, which conveniently may be gravel particles for a purpose which will become apparent as the description proceeds.

The air introduced into the solution through conduit 19 and perforations 20, after passing through the solution contained within the device 10, rises upwardly from the free surface of the liquid contained within the device and will carry with it that portion of the liquid that has become vaporized as a result of evaporation of the liquid caused by the air. If it is desired to recover such vaporized moisture, the air and vaporized moisture rising from the free surface of the liquid within the device 10 may be collected in a hood and discharged through an outlet connection 24 that is chilled in a well konwn manner to condense and recover the vaporized moisture. Liquid to be treated is conveyed from a suitable source of such liquid, not shown, into the central portion of the device that is surrounded by inner wall 14 by means of a inlet conduit 25. If desired and if the temperature of the incoming liquid is sufficiently low, such incoming liquid may be used as a chilling medium to condense the vapor in outlet 24.

To facilitate understanding the operation of this device it will be assumed that the liquid to be treated is a salt water or brine solution of the type encountered with oil or gas well operations and that such brine solution also contains other materials such as hydroxides and sulfates of iron, calcium and magnesium. Initially, the brine is caused to flow into the device 10 through inlet conduit 25 until the device becomes filled with the brine solution and the level of the surface thereof is slightly above the level of conduit 18.

At that time, suitable valves, not shown, in conduit lines 18 and 25 are adapted in a well known manner to balance the rate of inflow with the rate of removal so that the level of the liquid within the device remains substantially constant.

As is best shown in FIG. 2, the incoming brine first flows downwardly within the central portion encompassed by inner wall 14 and, as the brine approaches the bottom of the container its direction of flow is reversed and the brine then flows upwardly through the space formed between the lower edge portion of baffle 15 and the outer wall 11. The solution thereafter continues its upward movement within the annular space defined between outer wall 11 and inner wall 14 until it is withdrawn through conduit 18. As the device 10 begins to fill with liquid the air supply is turned on to introduce air at low pressure into the interior of the device as noted heretofore. The precise value of the air pressure is not particularly critical but the pressure should be sufficient to overcome the pressure exerted by the head of liquid at the location of perforations 20 and sufficiently in excess thereof to insure that the air will flow upwardly through the liquid within the device and rise upwardly from the free surface of the liquid. Thus, the pressure of the air will exceed the vapor pressure at the water surface so that a portion of the water will be evaporated and the air rising from the water surface will be saturated with water vapor. In general, the use of pressures in excess of that necessary to exceed the vapor pressure of the water will not further enhance the evaporation process and are generally undesirable and wasteful since they merely increase the amount of power required to compress the air. In general, substantially large volumes of air are employed. The number of cubic feet per minute of air required will depend upon variables which include the surface area, air temperatures, and desired rate of water removal from the brine solution.

Since the incoming brine solution first flows downwardly through the central passageway encompassed by inner wall 14 and then flows upwardly through the annular passageway defined by outer wall 11 and inner wall 14 prior to its removal through conduit 18, a maximum amount of time is provided for the air to bubble through the brine solution while it is within the device 10. Additionally, the combination of water removal from the solution coupled with the initial downward velocity of the solution followed by the reversal in direction of such velocity subject the precipitable constituents of the solution to inertial forces which together with the effect of gravity causes the settleable components such as the hydroxides and sulfates of iron, calcium and magnesium to settle in the conical bottom portion 12 of the device and form a sludge. The outwardly flaring baffle portion 15 effectively prevents such sludge components from being carried upwardly into the upper portion of the device. The sludge is removed as desired through conduit 16 and valve 17. As a portion of the water is evaporated due to the above noted action of the air passed through the solution, the water content of the brine is reduced and the salt concentration is thereby increased. Thus, brine concentrate is removed through conduit 18 which is substantially free from the sludge components as noted above. If desired, a plurality of devices 10 may be utilized for multiple stage treatment, in which case the brine concentrate removed through conduit 18 of the first such device constitutes the inlet for the second stage device.

Although the operation of the device has been described above in connection with the treatment of a brine solution, it will be apparent to those skilled in the art that the invention is not necessarily limited thereto but is equally useful for concentrating and separating precipitable constituents from any type of aqueous solution. Additionally, the invention is equally useful in connection with similar treatments to be effected on non-aqueous solutions if the pressure exceeds the vapor pressure of the non-aqueous liquid to effect evaporation thereof.

While particular embodiments of the invention have been illustrated and described, it will be obvious that various changes and modifications may be made without departing from the invention and is intended in the appended claims to cover all such changes and modifications that fall within the true spirit and scope of the invention.

What is claimed is:

1. A device for the recovery of constituents of a liquid solution comprising two concentric vertical cylindrical chambers,
   an inverted frusto-cone connected to the lower end of the outer chamber,
   an upright frusto-cone attached at its upper narrower base to the lower end of the inner cylinder such that a small annular clearance exists around the lower end of the said upright frusto-cone which end is above said inverted frusto-cone,
   an air sparge conduit opening into the lower end of the inner cylinder above said upright frusto-cone,
   a liquid inlet conduit at the upper end of the inner chamber,
   a perforate plate in the upper portion of the inner chamber,
   a cap overlying the outer cylinder for withdrawal of air containing liquid vapor,
   an overflow liquid outlet means in the upper portion of the outer cylinder, a solids removal means in said inverted frusto-cone.

2. A device for the recovery of constituents of a liquid solution containing settleable material comprising:
   a pair of concentric vertical cylindrical chambers,
   a bottom connected to the lower end of the outer chamber,
   a member connected to the lower end of the inner chamber and extending outwardly and downwardly therefrom and having a peripheral edge spaced from and forming with the outer chamber a small annular clearance which edge is above said bottom,
   a perforate plate in the upper end of the inner chamber for admitting liquid thereinto,
   an air sparge conduit opening into the lower end of the inner chamber above said member, liquid removal means in the upper portion of the outer chamber, and a solids removing means in said bottom.

References Cited

UNITED STATES PATENTS

| | | | |
|---|---|---|---|
| 841,030 | 1/1907 | Marshall | 127—15 |
| 1,945,281 | 1/1934 | Leithauser | 159—45 |
| 2,435,898 | 2/1948 | Otto. | |
| 2,579,203 | 12/1951 | Putney | 261—9 X |
| 2,638,444 | 5/1953 | Kappe | 210—2 |
| 1,936,308 | 11/1933 | Mueller | 23—273 X |
| 3,071,447 | 1/1963 | Bernhardi | 23—273 |
| 3,292,999 | 12/1966 | Chirico | 159—45 X |
| 3,416,889 | 12/1968 | Caldwell | 23—273 X |

NORMAN YUDKOFF, Primary Examiner

J. SOFER, Assistant Examiner

U.S. Cl. X.R.

23—273; 159—45